US011905144B2

(12) United States Patent
Cadou

(10) Patent No.: US 11,905,144 B2
(45) Date of Patent: Feb. 20, 2024

(54) CONTROL OF A HANDLING MACHINE

(71) Applicant: MANITOU BF, Ancenis (FR)

(72) Inventor: Sylvain Cadou, Ancenis (FR)

(73) Assignee: Manitou BF, Ancenis (FR)

( * ) Notice: Subject to any disclaimer, the term of this patent is extended or adjusted under 35 U.S.C. 154(b) by 1012 days.

(21) Appl. No.: 16/627,121

(22) PCT Filed: Jul. 9, 2018

(86) PCT No.: PCT/EP2018/068552
§ 371 (c)(1),
(2) Date: Dec. 27, 2019

(87) PCT Pub. No.: WO2019/016013
PCT Pub. Date: Jan. 24, 2019

(65) Prior Publication Data

US 2020/0115194 A1 Apr. 16, 2020

(30) Foreign Application Priority Data

Jul. 17, 2017 (EP) .................................... 17181714

(51) Int. Cl.
*B66C 13/18* (2006.01)
*B66C 23/90* (2006.01)
*B66F 17/00* (2006.01)

(52) U.S. Cl.
CPC ............ *B66C 13/18* (2013.01); *B66C 23/905* (2013.01); *B66F 17/003* (2013.01)

(58) Field of Classification Search
CPC ...... B66C 13/18; B66C 23/905; B66F 17/003
See application file for complete search history.

(56) References Cited

U.S. PATENT DOCUMENTS 4,815,614 A * 3/1989 Putkonen .............. B66C 23/905 340/685
4,942,529 A * 7/1990 Avitan .................. B66F 17/003 340/685

(Continued)

FOREIGN PATENT DOCUMENTS

CN 1681731 A 10/2005
CN 1950574 A 4/2007

(Continued)

OTHER PUBLICATIONS

International Search Report dated Nov. 9, 2018.

(Continued)

*Primary Examiner* — Kyle O Logan
(74) *Attorney, Agent, or Firm* — CALDERON SAFRAN & COLE P.C.; Corinne Marie Pouliquen

(57) ABSTRACT

The invention relates to a control method for controlling an actuating device in a handling machine, comprising: comparing (24) a magnitude representative of the movement speed executed or to be executed in response to a movement request signal to a threshold representative of a maximum authorised speed and controlling an actuating device according to the result of said comparison, so as to: execute or sustain (25) the movement of a handling arm as long as the magnitude representative of the speed of the movement executed or to be executed is less than said threshold, and prevent or stop (26) the movement of the handling arm as soon as the magnitude representative of the speed of movement executed or to be executed is greater than said threshold.

15 Claims, 5 Drawing Sheets

(56) References Cited

U.S. PATENT DOCUMENTS

| | | | | | |
|---|---|---|---|---|---|
| 5,119,949 | A * | 6/1992 | Kishi | B66C 23/90 | 212/277 |
| 5,639,119 | A * | 6/1997 | Plate | B62D 49/08 | 280/124.112 |
| 6,994,223 | B1 * | 2/2006 | Edgar, II | B66C 23/905 | 212/278 |
| 9,120,651 | B1 * | 9/2015 | Bailey | B66F 9/0755 | |
| 11,286,141 | B2 * | 3/2022 | Lotti | B66F 9/07568 | |
| 2004/0158380 | A1 * | 8/2004 | Farber | B66F 17/003 | 340/440 |
| 2005/0281656 | A1 * | 12/2005 | Bozem | B66F 17/003 | 414/635 |
| 2006/0103336 | A1 * | 5/2006 | Brooks | B66F 9/0655 | 318/139 |
| 2007/0229007 | A1 * | 10/2007 | Morinaga | E02F 9/2075 | 318/268 |
| 2008/0011530 | A1 * | 1/2008 | Oka | B60W 50/087 | 187/224 |
| 2010/0012610 | A1 * | 1/2010 | Rudy | B66C 23/905 | 212/270 |
| 2010/0063682 | A1 * | 3/2010 | Akaki | B66F 17/003 | 701/41 |
| 2010/0322753 | A1 * | 12/2010 | Brooks | B66F 17/003 | 414/718 |
| 2011/0120968 | A1 * | 5/2011 | Stinis | B66C 15/065 | 212/71 |
| 2012/0039696 | A1 * | 2/2012 | Brooks | B66F 17/003 | 701/50 |
| 2012/0209478 | A1 * | 8/2012 | Dammeyer | B66F 9/087 | 701/50 |
| 2013/0238202 | A1 * | 9/2013 | Aulton | B66F 9/0655 | 701/50 |
| 2013/2038202 | | 9/2013 | Aulton et al. | | |
| 2014/0058636 | A1 * | 2/2014 | Woods | B66F 17/00 | 701/50 |
| 2015/0012188 | A1 * | 1/2015 | Scheider | B66C 13/063 | 701/50 |
| 2015/0177084 | A1 * | 6/2015 | Inoue | G01L 5/18 | 73/862.541 |
| 2015/0259184 | A1 * | 9/2015 | Koide | B66F 9/20 | 701/50 |
| 2016/0083233 | A1 * | 3/2016 | Yamada | B66F 17/003 | 414/664 |
| 2016/0101970 | A1 * | 4/2016 | Taki | B66F 17/003 | 701/50 |
| 2016/0236922 | A1 * | 8/2016 | Merlo | B66F 9/07559 | |
| 2017/0129757 | A1 * | 5/2017 | Haunold | B66F 9/22 | |
| 2021/0229965 | A1 * | 7/2021 | Sirén | B66C 13/46 | |

FOREIGN PATENT DOCUMENTS

| | | | |
|---|---|---|---|
| CN | 102398867 | A | 4/2012 |
| CN | 103097279 | A | 5/2013 |
| CN | 104961061 | A | 10/2015 |
| DE | 102011108874 | | 1/2013 |
| EP | 0059901 | A1 | 9/1982 |
| EP | 0206940 | A1 | 12/1986 |
| EP | 0731054 | A1 | 9/1996 |
| EP | 2263965 | A1 | 12/2010 |
| EP | 2 733 110 | | 5/2014 |
| JP | S61221099 | A | 10/1986 |
| JP | S63114730 | | 5/1988 |
| JP | H05319785 | A | 12/1993 |
| JP | 3252006 | B2 | 1/2002 |
| JP | 2005 273262 | A | 10/2005 |

OTHER PUBLICATIONS

BSI Standards Publication, "BS EN 280:2013+A1:2015: Mobile elevating work platforms—Design calculations—Stability criteria—Construction—Safety—Examinations and tests", BSI Standards Limited, Sep. 2015; ISBN: 9780580855467.

BSI Standards Publication, "BS EN 1459:1998+A3:2012:Safety of industrial trucks—Self-propelled variable reach trucks", BSI Standards Limited, Mar. 2012; ISBN: 9780580748240.

English language translation of JPH05319785(A).

JCB Work Platform, "Operator's Manual Supplement", JCB Work Platform, 9831-2400-1, Issue 1, Dec. 2015.

Manitou BF, "MLT Operator's Manual", 647082 EN, Manitou, Jul. 4, 2012.

Manitou BF, "MT 1740 Operator's Manual", 547751 EN, Manitou, Jul. 16, 1999.

Soderstrom et al., "System Identification", Prentice Hall International, Series in Systems and Control Engineering, Hemel Hempstead, U.K., 1989; ISBN: 0138812365.

English language translation of EP0059901, 25 pages.

English language translation of EP0206940, 11 pages.

English language translation of JPS61221099(A), 25 pages.

Trinkel, Bud, "Hydraulics & Pneumatics, Chapter 4: ISO Symbols", Sep. 29, 2006, 27 pages. Source: https://www.hydraulicspneumatics.com/other-technologies/chapter-4-iso-symbols#comment-o.

* cited by examiner

CONTROL OF A HANDLING MACHINE

RELATED APPLICATION

This application is a National Phase of PCT/EP2018/068552 filed on Jul. 9, 2018, which claims the benefit of priority from European Patent Application No. 171 81 714.1 filed on Jul. 17, 2017, the entirety of which are incorporated by reference.

TECHNICAL FIELD

The invention relates to the field of handling machines comprising a main body, generally intended to be disposed on the ground, at least one handling arm intended to receive a payload that must be moved, and an actuating device configured to execute a movement of the handling arm relative to the main body, and in particular relates to movable handling machines.

Such a machine particularly can be produced in the form of a truck with a telescopic arm, a forklift truck, a hoisting crane, a mechanical digger, a bucket loader or other.

TECHNOLOGICAL BACKGROUND

In the field of handling machines, some countries have decided to adopt standards that stipulate that manufacturers adhere to particular requirements in terms of monitoring and controlling the stability of the machine during its operation.

The forces at play in the stability of an operating handling machine involve both gravitational forces, also called static loads, namely the weight of the handling arm, the payload, the main body and/or other elements of the machine, and inertial forces, also called dynamic loads, namely accelerations transferred between the handling arm, the payload, the main body and/or other elements of the machine due to the movements performed during operation, in particular the movements of the handling arm and of the payload relative to the main body.

A limitation of the inertial forces can be intrinsically obtained by restricting the speed of movement of the components of the machine. Thus, European standard EN 1459: 1998 entitled "Safety of industrial trucks—self-propelled variable reach trucks" stipulates restricting the maximum lowering speed of the handling arm. In particular, this standard makes provision for limiting this speed so that the sudden stoppage of the handling arm loaded with the maximum payload cannot cause the machine to overturn, whilst tolerating a temporary lifting of the rear wheels of the machine.

However, imposing a permanent limitation of the speed would counteract the working efficiency objective that is sought in the field of handling machines. A permanent limitation of the speed therefore cannot constitute a satisfactory general solution to the problem of monitoring and of controlling the stability of operating machines.

Another well known solution for reducing the inertial forces exerted on the main body by the handling arm and the payload involves automatically slowing down the movement of the handling arm, in particular when said arm approaches an end of movement position. Solutions of this type are particularly described in publications GB-A-1403046, U.S. Pat. No. 4,006,347, EP-A-0059901, U.S. Pat. Nos. 5,333,533, 5,119,949 and GB-A-2390595.

In U.S. Pat. No. 5,333,533 a zone close to the end of the movement is defined by a work program stored in a control unit of the machine. This program defines end of travel positions of the handling arms relative to the body of the machine and predetermined zones in the vicinity of the end of travel positions, in which zones the movement is automatically slowed down. In addition to the improvement in the stability of the machine, other benefits resulting from slowing down the handling arms in the zone close to the end of the movement are taught: reduction in the fatigue and the wear of the handling arms and of their hydraulic actuators, improvement in the comfort of the operator.

In EP-A-0059901 a zone close to the end of the movement is also defined by end of travel positions of the ladder or of the handling arm that are stored in a control unit of the machine. These end of travel positions are also defined as a function of a payload borne by the ladder or handling arm so as to correspond to the stability limits of the vehicle.

In GB-A-1403046, U.S. Pat. No. 4,006,347, 5,119,949 or GB-A-2390595 a zone close to the end of the movement is defined by measuring a load representing the force moment applied on the machine.

Document EP-A-2733110 describes, in a similar manner to the aforementioned documents, a handling machine, in which the movement of the handling arm is controlled and modified automatically during an emergency situation using automatic correction measures comprising, for example, a lowering or a shortening of the telescopic boom.

Document EP-A-2736833 describes a handling machine, in which the movement of the handling arm is controlled and maintained at each position of the arm at a speed that is below a predetermined maximum movement speed.

Document EP-A-2263965 describes a handling machine, in which the speed of movement of the machine on the ground is measured in order to invalidate certain commands of the machine.

Documents JP-A-2005273262 and JP-A-563114730 use operating principles that are already described above.

SUMMARY

The aforementioned prior art has the disadvantage of depriving the operator of the effective control of the speed of movement of the handling arm, at least in a zone close to the end of the movement, which can increase their difficulty in performing precise positioning of the handling arm and can limit their acquisition of experience and of operational competence.

One idea behind the invention is to provide control methods and systems that are suitable for exercizing effective control of a movement by the machine operator, whilst guaranteeing reliable control of the stability of the machine.

To this end, the invention provides a handling machine comprising:

- a main body;
- a handling arm intended to receive a load that must be moved;
- an actuating device configured to execute a movement of the handling arm relative to the main body;
- a control component operable by a user in order to produce a movement request signal intended to direct the actuating device to execute or to stop a movement of the handling arm by the actuating device in response to the movement request signal, the movement request signal having an attribute representing a speed of the movement to be executed, the control component being operable by the user in order to adjust the attribute of the movement request signal from a plurality of attribute values respectively representing a plurality of speed values and a stop state;

a control unit configured to compare a magnitude representing the speed of the movement executed or to be executed in response to the movement request signal to a threshold representing a maximum authorized speed and to control the actuating device as a function of the result of said comparison, so as to:

execute or sustain the movement of the handling arm as long as the magnitude representing the speed of the movement executed or to be executed is less than said threshold; and prevent or stop the movement of the handling arm as soon as the magnitude representing the speed of the movement executed or to be executed is greater than said threshold.

The invention also provides a control method for controlling an actuating device in a handling machine comprising a main body and a handling arm intended to receive a load that must be moved, the actuating device being configured to execute a movement of the handling arm relative to the main body;

the method comprising:

comparing a magnitude representing the speed of the movement executed or to be executed in response to the movement request signal to a threshold representing an authorized maximum speed; and controlling the actuating device as a function of the result of said comparison so as to:

execute or sustain the movement of the handling arm as long as the magnitude representing the speed of the movement executed or to be executed is less than said threshold; and prevent or stop the movement of the handling arm as soon as the magnitude representing the speed of the movement executed or to be executed is greater than said threshold.

By virtue of these features, a movement of the handling arm executed by the machine is always executed in accordance with the movement request generated by the operator, but this movement is not executed or is interrupted when the request of the operator leads to or would lead to a threshold representing a maximum authorized speed being exceeded. In other words, the control unit acts as an all-or-nothing filter that executes or allows the execution of the movement requests that meet an authorization criterion, but which prevents or cancels the execution of movement requests that do not meet the authorization criterion. With this being the case, the control unit does not need to modify the movement requests sent by the operator, which leaves them with the effective control of these requests, particularly in terms of speed.

According to embodiments, the handling machine or the control method can comprise one or more of the following features.

The threshold representing a maximum speed can be determined in various ways, particularly with a view to excluding movements involving an excessive amount of movement, namely an amount of movement that the machine is not able to absorb or to dissipate without the risk of creating an instability.

According to one embodiment, the machine further comprises an overturning moment indicator sensor for measuring a magnitude indicating an overturning moment applied on the main body relative to an overturning axis.

The use of such an overturning moment indicator sensor allows the control unit to take into account information relating to the overturning moment at a given instant. Such an overturning moment indicator sensor can be arranged in various ways for measuring various magnitudes. According to one embodiment, the overturning moment indicator sensor comprises an extensometer, for example, an extensometer that is sensitive to the deformations of an axle of the suspension of the machine (variation in length between two separate limits on the axle) and/or of the handling arm. According to one embodiment, the overturning moment indicator sensor comprises a pressure sensor in the actuating device of the arm, for example, a pressure sensor arranged on a cylinder of the actuating device. According to another example, the overturning moment indicator sensor can be a load cell as mentioned in EP-A-1532065. The overturning moment indicator sensor also can be produced in the form of a measurement system comprising a plurality of sensors measuring a plurality of physical magnitudes and a processing unit for combining these measurements in the form of a magnitude indicating the overturning moment.

According to one embodiment, the machine further comprises a threshold determination module configured to determine the threshold representing a maximum authorized speed as a function of a measurement signal generated by the overturning moment indicator sensor. According to one embodiment, the threshold representing an authorized maximum speed has a downward trend when the overturning moment increases.

According to one embodiment, the overturning moment indicator sensor is arranged on an end portion of the main body rotated opposite the direction of the movement executed or to be executed in response to the movement request signal, and the magnitude measured by the overturning moment indicator sensor moves in the opposite direction to the overturning moment. Such an embodiment is illustrated, for example, in the case of an extensometer measuring the deformations of the rear axle of a handling vehicle, in which the handling arm extends toward the front of the vehicle.

According to one embodiment, the overturning moment indicator sensor is arranged on an end portion of the main body rotated toward the direction of the movement executed or to be executed in response to the movement request signal, and the magnitude measured by the overturning moment indicator sensor moves in the same direction as the overturning moment. Such an embodiment is illustrated, for example, in the case of an extensometer measuring the deformations of the front axle of a handling vehicle, in which the handling arm also extends toward the front of the vehicle.

The types of movement of the handling arm executed by the actuating device can be different, for example, a translation or rotation movement. According to a preferred embodiment, the actuating device is configured to execute a pivoting movement of the handling arm about an axis that is substantially horizontal relative to the main body.

The handling arm can have one or more degrees of freedom relative to the main body. When several degrees of movement exist with a plurality of actuating devices associated with these respective degrees of movement, the various actuating devices are not necessarily all controlled in the same way. In particular, the control methods described herein are preferably applied to the degree(s) of movement with a greater influence on the stability of the machine.

The magnitude representing the speed used to control the machine and/or the notification of the risk of overturning can be determined in various ways.

According to one embodiment, the control unit is configured to receive the movement request signal generated by the control component. In this case, the control unit can take into account an attribute of the movement request signal, for example, its amplitude, its frequency, its duration or any other predefined attribute, as a magnitude representing the speed of the movement to be executed. According to one embodiment, the comparison performed by the control unit is a comparison between the attribute of the movement request signal and said threshold.

The control component operable by the user can be produced in various ways, for example, in the form of a rocker arm, a rotary button, a touchscreen, or other. According to one embodiment, the control component operable by the user is coupled to the control unit in order to supply the control unit with the movement request signal in the form of an electrical signal. For example, the attribute of the movement request signal that represents the requested speed is a level of voltage, intensity, frequency or duration of the request signal.

According to one embodiment, a control method implemented by the control unit comprises a step of receiving the movement request signal.

According to other embodiments, the control component generating the movement request signal is not necessarily connected to the control unit or the control unit is not necessarily configured to be able to receive this movement request signal, for example, if it is a purely mechanical signal.

According to one embodiment that can be used in this case, the handling machine further comprises measurement means for measuring an instantaneous speed of the handling arm relative to the main body. In this case, the comparison performed by the control unit can be a comparison between said instantaneous speed and said threshold.

Various methods can be used for measuring an instantaneous speed of the handling arm relative to the main body. According to a more direct method, an angular or linear speed sensor can be used. According to a more indirect method, a correlated instantaneous speed magnitude of the handling arm can be measured, for example, the speed of a movable part coupled to the handling arm or other. According to one embodiment, in which the actuating device comprises a hydraulic actuator, the machine further comprises measurement means for measuring the hydraulic flow to be supplied to the hydraulic actuator as speed information. In this case, the comparison performed by the control unit can be a comparison between the hydraulic flow and said threshold.

The one or more actuating device(s) of the handling arm can be produced in various ways, for example, in the form of one or more electric or hydraulic actuators.

According to one embodiment, the actuating device comprises a hydraulic actuator and a variable flow device for regulating a hydraulic flow to be supplied to the hydraulic actuator. Such a variable flow hydraulic device can be produced in various ways.

According to one embodiment, the variable flow device comprises a variable flow pump. For example, in an inclined plate pump, the flow regulation component can influence an angle of incline of the inclined plate. According to one embodiment, the variable flow device comprises a proportional distributor. For example, in a proportional distributor, the flow regulation component can influence the position of a slide.

According to one embodiment, the control component operable by the user is functionally coupled, for example, mechanically or hydraulically, to the variable flow device so as to move a component for regulating the flow of the variable flow device as a function of the action of the user on the control component.

In such a case, the control unit is not necessarily able to prevent a direct activation of the variable flow device through the action of the user on the control component and the production of a resulting hydraulic flow.

According to one embodiment that can be used in this case, the actuating device further comprises a solenoid valve arranged between the variable flow device and the hydraulic actuator, with the solenoid valve being able to be controlled by the control unit in order to prevent or stop the movement of the handling arm as soon as the magnitude representing the speed of the movement executed or to be executed is greater than said threshold.

In such an embodiment, the movement request signal can be a movement of the component for regulating the flow of the variable flow device. Such a movement can be measured by a transducer and supplied to the control unit in the form of an electrical signal. However, it is not always possible or desirable to provide such a transducer in the variable flow device, particularly for reasons taking into account the spatial requirement or the cost of the variable flow device. In the absence of such a transducer, the control unit cannot be easily supplied with the movement request signal. In this case, the control unit can operate on the basis of a measurement of an effective movement of the handling arm rather than from a movement request signal.

In a preferred embodiment, the solenoid valve is a progressive start-up valve. The use of a progressive start-up valve allows a reliable measurement of the instantaneous speed of the handling arm to be obtained before the handling arm has achieved a significant amount of movement, so that cutting off the movement can occur without any excessive shock in the event that the authorized speed threshold is exceeded.

One idea behind another aim of the invention is to provide methods and systems for indicating a risk of instability in a handling machine, which are able to assist an operator of the machine in performing a manual control of the movements without compromising either the effectiveness or the safety of the machine.

To this end, according to a second aim, the invention also provides a handling machine comprising:

- a main body;
- a handling arm intended to receive a load that must be moved;
- an actuating device configured to execute a movement of the handling arm relative to the main body; and
- a control unit configured to form an overturning risk signal cumulatively comprising:
- an actual contribution dependent on a magnitude indicating an overturning moment applied on the main body relative to an overturning axis; and
- a virtual contribution dependent on a magnitude representing the speed of a movement of the handling arm executed or to be executed by the actuating device, with the movement of the handling arm being oriented in a direction non-parallel to the overturning axis.

The invention also provides a signaling method for indicating an overturning risk in a handling machine comprising a main body and a handling arm intended to receive a load that must be moved, the actuating device being configured to execute a movement of the handling arm relative to the main body, the method comprising:

measuring a magnitude indicating an overturning moment applied on the main body relative to an overturning axis;

measuring a magnitude representing the speed of a movement of the handling arm executed or to be executed by the actuating device, the movement of the handling arm being oriented in a direction non-parallel to the overturning axis; and forming an overturning risk signal comprising an actual contribution dependent on the magnitude indicating the overturning moment and a virtual contribution dependent on the magnitude representing the speed, with the actual contribution and the virtual contribution being cumulative.

By virtue of these features, an overturning risk signal can be sent to the operator or to an automated control system, which reflects both the contribution of the gravitational forces to the instability of the machine, in the form of the actual contribution dependent on the magnitude indicating the overturning moment, and the contribution of the inertial forces to the instability of the machine, in the form of the virtual contribution dependent on the magnitude representing the speed. However, the inertial forces are taken into account in a virtual form, without said forces actually being produced. Thus, the virtual contribution dependent on the magnitude representing the speed represents an ability of the handling arm to apply inertial forces to the body of the machine if it had just been immobilized relative to said body.

According to embodiments, the handling machine or the signaling method can comprise one or more of the following features.

According to one embodiment, the magnitude indicating an overturning moment is measured by an overturning moment indicator sensor, arranged, for example, on an axle of the handling machine or in the vicinity of a cylinder of the actuating device.

According to one embodiment, an instantaneous speed of the handling arm is measured relative to the main body as a magnitude representing the speed.

According to another embodiment, an attribute of a movement request signal intended to direct the actuating device is determined as a magnitude representing speed.

According to one embodiment, the method further comprises the generation of a visible or audible signal intended for an operator as a function of the overturning risk signal.

According to one embodiment, the machine further comprises a display panel connected to the control unit to display a visual scale as a function of the overturning risk signal. Alternatively, two separate visual scales can be displayed to separately represent the two contributions.

These signaling methods for a handling machine can be used to assist an operator responsible for controlling the movements of the handling arm. They are applicable to the assistance of an automated control system, to which the overturning risk signal will be supplied.

Some aspects of the invention are based on the idea of analyzing the energy state of a handling machine as a potential gravity energy contribution and a kinetic energy contribution. In terms of potential energy, the stability of the machine in the gravitational field is expressed by the positioning of the current state of the machine at the bottom of a potential well, which can be deeper or shallower depending on the mass and the position of the payload. In terms of kinetic energy, the speed of movement of the handling arm relative to the main body is expressed by an amount of energy that is likely to be transferred to the main body, with a relatively high yield, in the event of the modification of the mechanical coupling between them, for example, in the event of sudden stoppage of the movement. One idea behind the invention is to control and/or allow an operator to control this kinetic energy to ensure that it does not exceed an energy level so that it becomes likely to be able to force the handling machine out of the potential well expressing its stable state.

BRIEF DESCRIPTION OF THE FIGURES

The invention will be better understood, and further aims, details, features and advantages thereof will become more clearly apparent throughout the following description of several particular embodiments of the invention, which are provided solely by way of a non-limiting illustration, with reference to the accompanying drawings, in which.

DETAILED DESCRIPTION OF EMBODIMENTS

Embodiments of a handling machine will be described hereafter that is in the form of a movable telescopic truck supporting a handling arm projecting toward the front of the vehicle. In this configuration, the risk of overturning manifests in the forward direction about the overturning axis formed by the front wheels of the vehicle. Consequently, monitoring and controlling this overturning risk involves taking into account the inertial forces oriented in the forward direction, i.e. the movements involving a significant amount of movement in this direction.

In a handling machine with a different configuration, the overturning axis can be located in a different manner. The movements to be taken into account then must be selected as a function of the location of this axis.

Figure 1:
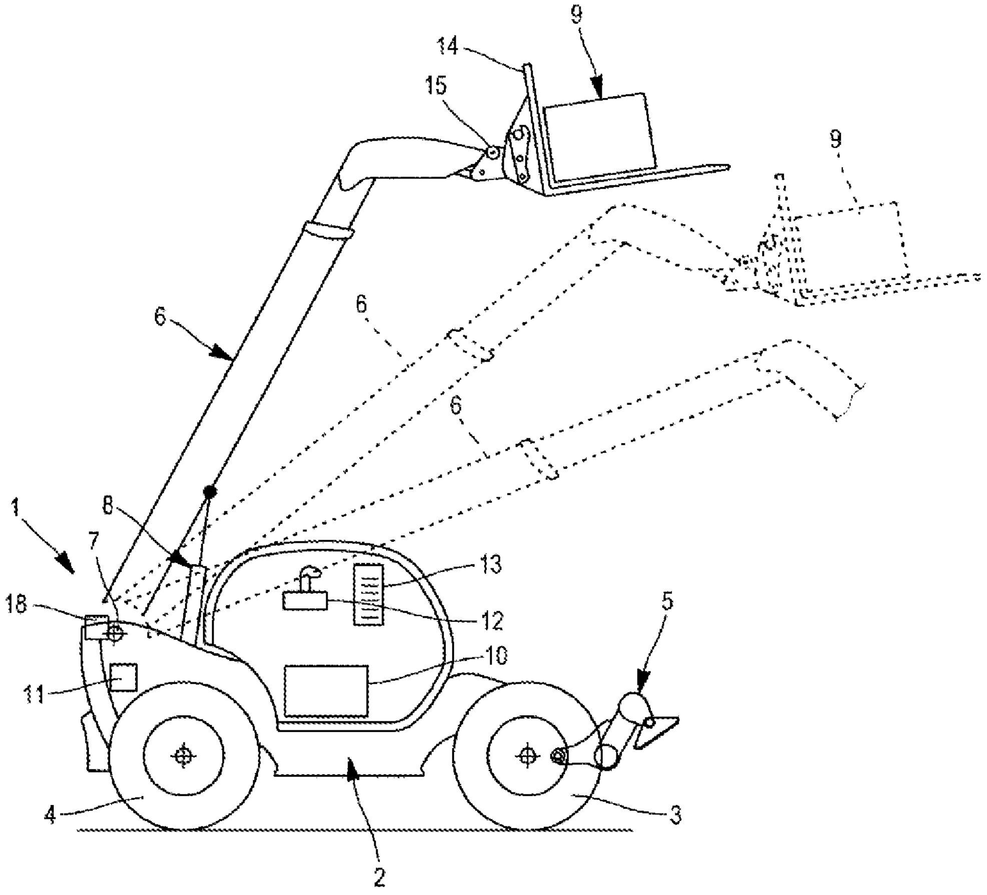
FIG. 1 is a schematic representation of a telescopic truck, in which embodiments of the invention can be implemented.

With reference to FIG. 1, the telescopic truck 1 comprises a frame 2 supported on the ground by means of a front axle 3 and a rear axle 4. Stabilizing feet 5 optionally can be deployed for lifting the front axle 3, in which case the stabilizing feet 5 define the overturning axis toward the front. The frame 2 has a relatively high mass due to its construction and the mechanical elements that it supports, according to the known technique.

The handling arm 6 is articulated on the frame 2 about a horizontal axis 7. A lifting actuator, for example, a hydraulic cylinder 8, allows the handling arm 6 to move upward and downward about the horizontal axis 7, under the control of a control system. The control system comprises a control unit 10 and a control component 12 operable by an operator, which are schematically outlined in FIG. 1.

FIG. 1 illustrates the handling arm 6 and a payload 9 in an upper position as a solid line and in a plurality of lower positions as a dashed line. With all other things being equal, the static overturning moment exerted by the handling arm 6 in the forward direction increases as its position descends toward the horizontal.

An indicative measurement of this static overturning moment can be obtained using an overturning moment indicator sensor that can be positioned in various ways. FIG. 1 illustrates an overturning moment indicator sensor 11 positioned on the rear axle, according to the known technique.

The overturning moment indicator sensor 11 generates a measurement signal that represents a stability reserve of the handling machine 1 relative to the overturning axis.

A known method for monitoring and controlling the overturning risk involves processing the measurement signal of the overturning moment indicator sensor 11 using the control unit 10 in order to, on the one hand, display an indicator of visual stability in the cabin of the machine, for example, on a luminous display panel 13 disposed in the cabin and, on the other hand, interrupt the downward movement of the handling arm 6 when the measurement signal drops below a predefined threshold. However, due to the inertial forces generated by interrupting the movement, this method requires setting the threshold with a high safety margin, which limits the capabilities of the machine, and/or controlling an automatic slowing down of the movement before the interruption, which deprives the operator of control of the speed.

To avoid this, the control system can implement control methods that will be described with reference to FIGS. 2 and 3. These control methods are based on the principle of allowing the operator to control the movement of the handling arm 6 using the control component 12. In particular, the control system adjusts the speed of the movement to be executed as a function of a movement request generated by the operator by activating the control component 12, and in particular a quantitative magnitude generated by the action of the user on the control component 12 and representing a speed level requested by the user. For example, the quantitative magnitude is an angle of incline of a pivoting lever of the control component 12, in which a higher angle represents a higher speed request and a zero angle of incline (neutral position) represents a stop request. The control system immediately stops the movement in response to the stop request generated by the operator.

Figure 2:
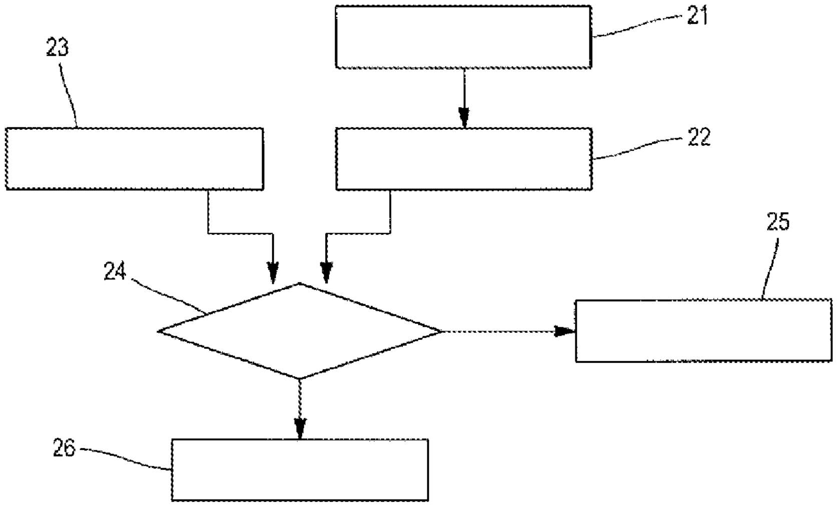
FIG. 2 is a diagram of a step representing a control method, according to a first embodiment, that can be used in the telescopic truck.

FIG. 2 illustrates a control method using a measurement of the effective speed of the handling arm 6. FIG. 3 illustrates a control method using a speed request generated by the operator. These methods can be executed as a loop by an electronic circuit.

The method of FIG. 2 comprises the following steps:

Step 21: acquiring the measurement signal from the overturning moment indicator sensor 11.

Step 22: determining an authorized speed threshold as a function of the measurement signal. This determination can be based on reading a table stored in a memory and containing threshold values associated with values of the measurement signal or value ranges of the measurement signal.

Step 23: acquiring the measurement signal from a speed sensor of the handling arm 6. This speed sensor is, for example, an angular speed sensor 18 outlined in FIG. 1.

Step 24: comparing the speed of the handling arm 6 with the authorized speed threshold.

Step 25, if the measured speed is less than the authorized speed threshold: executing or continuing the execution of the movement in accordance with the movement request generated by the operator.

Step 26, if the measured speed is greater than the authorized speed threshold: stopping or preventing the movement of the handling arm 6 despite the request of the operator. This stopping or preventing expresses the fact that the operator has requested an excessively high movement speed relative to the stability reserve available at the same instant. The control system does not authorize the execution of this request. In other words, if a movement was ongoing, it stops immediately and if no movement was ongoing, the stop state remains despite the request of the operator.

Based on the stop state generated in step 26, it is preferable to stipulate a positive resetting action by the operator before they are again able to send a movement request, for example, a new request with a lower speed level. This resetting action preferably can be executed by means of the control component 12, by an ergonomics measurement. For example, the resetting action involves returning the pivoting lever to the neutral position before re-inclining it forward.

The authorized speed threshold read in step 22 may have been determined by tests. In a qualitative manner, this authorized speed threshold represents an amount of movement or kinetic energy that the handling truck 1 is able to absorb without overturning in the event that the movement of the handling arm 6 is instantly stopped. This authorized speed threshold therefore decreases during a lowering movement of the handling arm 6 as the stability reserve decreases that is indicated by the measurement of the overturning moment indicator sensor 11. In another embodiment, the authorized speed threshold may have been determined by a computation and stored or can be determined by a real-time computation in step 22.

One effect of the control method described above therefore is that, starting from the upper position illustrated in FIG. 1, if the operator generates a constant lowering movement request, the movement is executed at a constant speed as long as the authorized speed threshold remains greater than this speed and is instantly interrupted when the authorized speed threshold is exceeded.

As the control system equally reacts to a given movement request, and in particular does not modify the movement speed executed in response to a given request, the operator is able to acquire, through experience, detailed knowledge of the response of the machine and is capable of best adapting their request as a function of the circumstances.

Figure 3:
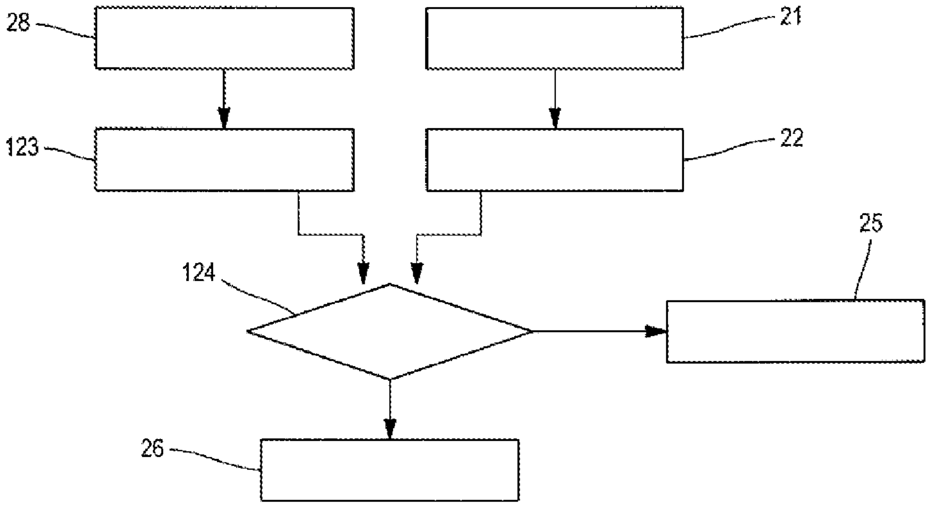
FIG. 3 is a diagram of a step representing a control method, according to a second embodiment, that can be used in the telescopic truck.

In FIG. 3, the steps modified compared to the method of FIG. 2 use the same reference number increased by 100. The unchanged steps use the same number and are not described again.

Step 28: acquiring the movement request signal generated by the operator, for example, in the form of an electrical signal.

Step 123: determining a requested movement speed as a function of the movement request signal. For example, the requested speed is encoded in the amplitude or another attribute of the movement request signal.

Step 124: comparing the requested movement speed with the authorized speed threshold.

Step 25, if the requested speed is less than the authorized speed threshold.

Step 26, if the requested speed is greater than the authorized speed threshold.

It will be understood that in these methods no movement is executed other than a movement in accordance with the movement request generated by the operator.

The control system for executing such a control method can be implemented in various ways. Three embodiments will now be described with reference to FIGS. 4 to 6.

Figure 4:
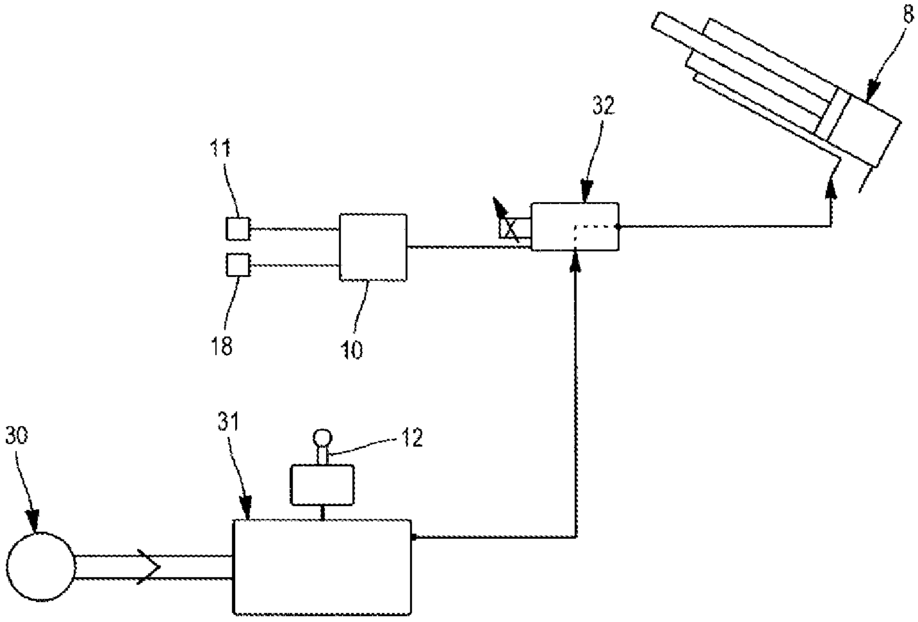
FIG. 4 is a schematic representation of a hydraulic actuating device, according to a first embodiment, that can be used in the telescopic truck.

In FIG. 4, the control system is suitable for implementing the method of FIG. 2. FIG. 4 shows the hydraulic cylinder 8, a hydraulic pressure source 30, a hydraulic distributor 31 interposed between them to control a hydraulic flow to be supplied to the hydraulic cylinder 8, the control component 12 in the form of a lever directly coupled to the slide of the hydraulic distributor 31, the control unit 10, the overturning moment indicator sensor 11 and the angular speed sensor 18 connected to the control unit 10, and a solenoid valve 32 interposed between the hydraulic distributor 31 and the hydraulic cylinder 8. The solenoid valve 32 is controlled by the control unit 10.

In this system, as the control unit cannot prevent the hydraulic distributor 31 from opening under the action of the user when the speed is too high, it is the solenoid valve 32 that is used to interrupt the hydraulic flow in order to immediately stop the movement in step 26.

Preferably, the solenoid valve 32 is a progressive start-up valve. The use of a progressive start-up valve prevents the possible restarting of the movement by the operator following the resetting action from occurring too quickly relative to the speed measurement taken by the speed sensor 18.

Figure 5:
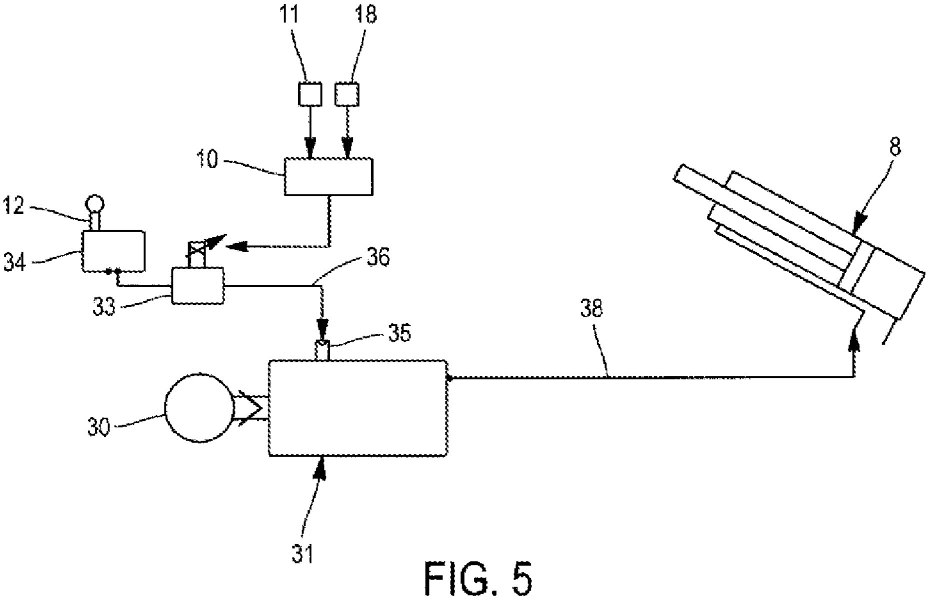
FIG. 5 is a schematic representation of a hydraulic actuating device, according to a second embodiment, that can be used in the telescopic truck.

In FIG. 5, the elements that are similar or identical to those of FIG. 4 use the same reference number. In this embodiment, the hydraulic distributor 31 does not have a mechanical control directly connected to the control component 12, but it has a hydraulic control. In particular, the hydraulic flow 38 corresponding to the lowering movement of the handling arm 6 can be obtained by sending a pilot pressure 36 into a control port 35.

The control component 12 is coupled to a control valve 34 controlling this pilot pressure. The control unit 10 is configured to control a solenoid valve 33 arranged between the control valve 34 and the control port 35. Thus, in step 26, the control unit 10 can switch the valve 33 in order to return the hydraulic distributor 31 to a neutral position. Preferably, the solenoid valve 33 is a progressive start-up valve.

Figure 6:
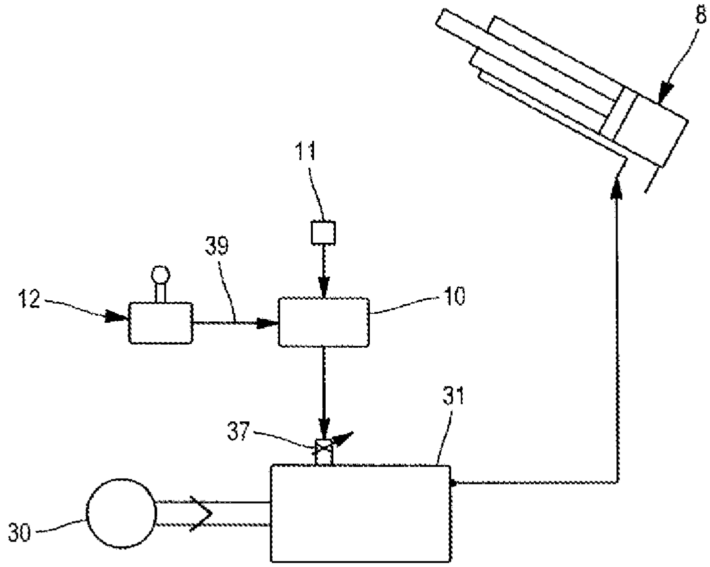
FIG. 6 is a schematic representation of a hydraulic actuating device, according to a third embodiment, that can be used in the telescopic truck.

In FIG. 6, the control system is suitable for implementing the method of FIG. 3. The control component 12 generates electrical request signals 39 and the hydraulic distributor 31 is controlled using an electrical signal applied on a control port 37. The control unit 10 is interposed between the control component 12 and the hydraulic distributor 31 and therefore can directly control the hydraulic distributor 31 in steps 25 and 26. A speed sensor for the handling arm 6 is not essential in this embodiment, since the control unit 10 can determine the requested speed directly from the request signal 39.

Other control systems can be designed depending on the nature of the actuator to be controlled. The handling arm 6 can have degrees of movement other than the pivoting movement about the horizontal axis 7, in particular a degree of linear telescoping movement and a degree of pivoting of the tool about a horizontal axis 15. The control methods described above can be used to control one or more of these degrees of movement. When several degrees of movement are present, the actuators responsible for executing the corresponding movements are not necessarily all controlled in the same way.

Figure 9:
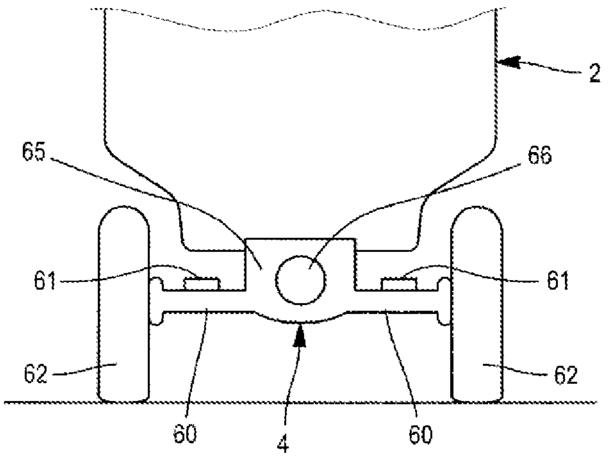
FIG. 9 is a schematic representation of a wheel support arm equipped with an extensometer that can act as an overturning moment indicator device.

FIG. 9 represents an embodiment of the rear axle 4 of the telescopic truck 1. The rear axle 4 comprises two wheel support arms 60 supporting the rear wheels 62. One or each of the wheel support arms 60 is equipped with an extensometer 61 arranged to measure bending deformations of the wheel support arm 60. More specifically, the extensometer 61 measures the variation in length between two separate limits on the wheel support arm 60. The measurement signals of the extensometers 61 can be used to form the overturning moment indicator signal, for example, as an average of the two measurement signals. Alternatively, it is possible to use a single extensometer 61 to generate the overturning moment indicator signal. Preferably, the rear axle 4 is connected in an oscillating manner to the frame 2 by means of a pivot 66 with a longitudinal axis passing through a central part 65 of the axle.

Figure 7:
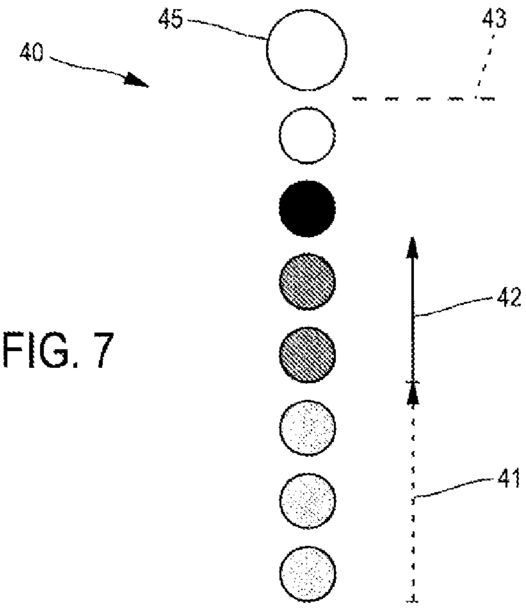
FIG. 7 is a schematic representation of a signaling device that can be used in the telescopic truck.

With reference to FIG. 7, a signaling method will now be described that can be used in the telescopic truck 1 to assist the operator in controlling the handling arm 6 in a safe and efficient manner.

FIG. 7 represents an overturning risk signal 40 that can be displayed on the display panel 13 to represent the overturning risk on a visual scale as a function of the instantaneous state of the telescopic truck 1. To this end, the amplitude of the overturning risk signal that controls the height of the scale that must be displayed, for example, the number of lamps that must be illuminated, cumulatively comprises an actual contribution 41 dependent on the measurement signal generated by the overturning moment indicator sensor 11 and a virtual contribution 42 dependent on a magnitude representing the movement speed of the handling arm 6, for example, the requested movement speed, as determined in step 123 of FIG. 3, or the effective movement speed, as measured in step 23 of FIG. 2. The last level 45 of the scale corresponds, for example, to the automatic interruption of the movement by the control unit 10.

In one embodiment, the contributions of the overturning risk signal 40 can be computed as follows. The actual contribution 41 can be inversely proportional to the magnitude measured by the overturning moment indicator sensor 11 and can be standardized on a scale of 0 to 1, where 0 corresponds to a normal overturning moment value and 1 corresponds to a maximum overturning moment value, i.e. a state in which it must no longer be possible to further lower the handling arm 6, even at low speed.

The virtual contribution 42 can equal:

$$B=(1-A)*Q,$$

where A denotes the actual contribution 41 located between 0 and 1 and Q denotes a ratio between the movement speed requested or executed at a given instant and the authorized threshold speed at the same instant, i.e. a ratio that remains below 1 by design.

By generating the overturning risk signal 40 in this way, an optimal level exists that is schematically illustrated by number 43, which corresponds to the maximum speed that can be produced without the movement being interrupted by the control unit 10. The operator therefore can use the overturning risk signal 40 as a visual reference for adapting their movement request in order to remain close to the optimum level 43 during the downward movement of the handling arm 6.

Figure 8:
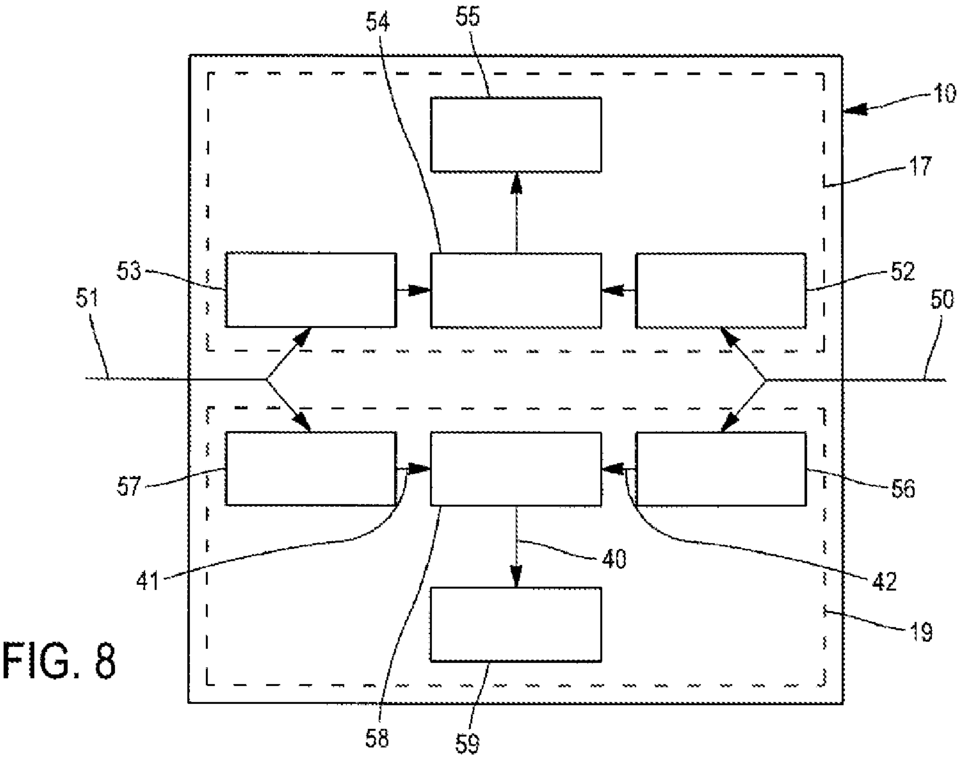
FIG. 8 is a functional schematic representation of a control unit that can be used in the telescopic truck.

FIG. 8 is a functional representation of an embodiment of the control unit 10. It comprises a functional control module 17 and a functional signaling module 19 that can operate with two input signals. A first input signal 50 is a signal indicating the speed of the movement executed or to be executed, for example, the request signal generated by the control component 12 or the measurement signal of the speed sensor 18. A second input signal 51 is a signal indicating the static stability reserve of the machine, for example, the measurement signal of the overturning moment indicator sensor 11.

The functional control module 17 comprises:

a speed computation module 52 configured to compute an executed or requested speed value on the basis of the first input signal 50;

a speed threshold computation module 53 configured to determine the authorized speed threshold on the basis of the second input signal 51;

a comparator module 54 for comparing the executed or requested speed value with the authorized speed threshold; and a control module 55 for controlling the lifting actuator as a function of the result of the comparison, either directly or by controlling intermediate control elements (in particular the valve 32, the valve 33, the distributor 31).

The functional signaling module 19 comprises:

a virtual contribution computation module 56 configured to compute the virtual contribution 42 on the basis of the first input signal 50;

an actual contribution computation module 57 configured to compute the actual contribution 41 on the basis of the second input signal 51;

an adder module 58 for adding the actual contribution 41 and the virtual contribution 42; and a control module 59 for controlling the display panel 13 as a function of the overturning risk signal 40.

The overturning risk signal 40 could be sent to the operator in visual forms other than a scale, for example, a color code. The overturning risk signal 40 could be sent to the operator in an audible or other form.

Some elements that are shown, in particular the control unit, can be produced in different forms, unitarily or apportionately, by means of hardware and/or software components. Usable hardware components are ASIC specific integrated circuits, FPGA programmable logic arrays or microprocessors. Software components can be written using various programming languages, for example, C, C++, Java or VHDL. This list is not exhaustive.

The methods and systems described above within the context of a telescopic truck are applicable to other handling machines.

Although the invention has been described in relation to several particular embodiments, it is obvious that it is by no means limited thereby and that it comprises all the technical equivalents of the means described and the combinations thereof if they fall within the scope of the invention.

The use of the verb "comprise" or "include" and of its conjugated forms does not exclude the presence of other elements or other steps than those stated in a claim. The use of the indefinite article "a" or "an" or "one" for an element or a step does not, unless otherwise specified, exclude the presence of a plurality of such elements or steps.

In the claims, any reference sign between parentheses cannot be interpreted as a limitation of the claim.

The invention claimed is:

1. A handling machine comprising:

a main body;

a handling arm intended to receive a load that must be moved;

an actuating device configured to execute a movement of the handling arm relative to the main body;

a control component operable by a user in order to generate a movement request signal intended to direct the actuating device to execute or to stop a movement of the handling arm by the actuating device in response to the movement request signal, the movement request signal having an attribute representing a speed of the movement to be executed, the control component being operable by the user in order to adjust the attribute of the movement request signal from a plurality of attribute values respectively representing a stop state and a plurality of speed values;

a control unit configured to compare a magnitude representing the speed of the movement executed or to be executed in response to the movement request signal to a threshold representing a maximum authorized speed and to control the actuating device as a function of the result of said comparison, so as to:

execute or sustain the movement of the handling arm as long as the magnitude representing the speed of the movement executed or to be executed is less than said threshold; and prevent or stop the movement of the handling arm as soon as the magnitude representing the speed of the movement executed or to be executed is greater than said threshold.

2. The machine as claimed in claim 1, further comprising an overturning moment indicator sensor (11) that is sensitive to a magnitude indicating an overturning moment applied on the main body relative to an overturning axis and a threshold determination module configured to determine the threshold representing a maximum authorized speed as a function of a measurement signal produced by the overturning moment indicator sensor (11).

3. The machine as claimed in claim 2, wherein the control unit is further configured to form an overturning risk signal cumulatively comprising:

an actual contribution dependent on the measurement signal generated by the overturning moment indicator sensor; and a virtual contribution dependent on said magnitude representing the speed of a movement of the handling arm executed or to be executed by the actuating device.

4. The machine as claimed in claim 2, wherein the threshold representing an authorized maximum speed has a downward trend when the overturning moment increases.

5. The machine as claimed in claim 1, wherein the actuating device is configured to execute a pivoting movement of the handling arm about an axis that is substantially horizontal relative to the main body.

6. The handling machine as claimed in claim 1, further comprising measurement means for measuring an instantaneous speed of the handling arm relative to the main body, wherein said comparison is a comparison between said instantaneous speed and said threshold.

7. The handling machine as claimed in claim 1, wherein the control unit is configured to receive the movement request signal generated by the control component and said comparison is a comparison between the attribute of the movement request signal and said threshold.

8. The machine as claimed in claim 1, wherein the control component operable by the user is coupled to the control unit in order to supply the control unit with the movement request signal in the form of an electrical signal.

9. The machine as claimed in claim 1, wherein the actuating device comprises a hydraulic actuator and a variable flow device for regulating a hydraulic flow to be supplied to the hydraulic actuator.

10. The machine as claimed in claim 9, wherein the control component operable by the user is functionally coupled to the variable flow device so as to move a component for regulating the flow of the variable flow device as a function of the action of the user on the control component, and wherein the actuating device further comprises a solenoid valve arranged between the variable flow device and the hydraulic actuator or the control component, the solenoid valve being able to be controlled by the control unit in order to prevent or stop the movement of the handling arm as soon as the magnitude representing the speed of the movement executed or to be executed is greater than said threshold.

11. The machine as claimed in claim 10, wherein the solenoid valve is a progressive start-up valve.

12. The machine as claimed in claim 9, wherein the variable flow device comprises a proportional distributor.

13. The machine as claimed in claim 3, further comprising a display panel connected to the control unit to display a visual scale as a function of the overturning risk signal.

14. A control method for controlling an actuating device in a handling machine comprising a main body and a handling arm intended to receive a load that must be moved, the actuating device being configured to execute a movement of the handling arm relative to the main body;

the method comprising:

comparing a magnitude representing the speed of a movement executed or to be executed in response to a movement request to a threshold representing an authorized maximum speed; and controlling the actuating device as a function of the result of said comparison so as to:

execute or sustain the movement of the handling arm as long as the magnitude representing the speed of the movement executed or to be executed is less than said threshold; and prevent or stop the movement of the handling arm as soon as the magnitude representing the speed of the movement executed or to be executed is greater than said threshold.

15. The method as claimed in claim 14, further comprising a step of receiving a movement request signal intended to direct the actuating device to execute a movement of the handling arm by the actuating device, the movement request signal having an attribute representing a movement speed to be executed.

* * * * *